(12) United States Patent
McBrearty et al.

(10) Patent No.: US 8,495,247 B2
(45) Date of Patent: Jul. 23, 2013

(54) LINKING A USER SELECTED SEQUENCE OF RECEIVED WORLD WIDE WEB DOCUMENTS INTO A STORED DOCUMENT STRING AVAILABLE TO THE USER AT A RECEIVING WEB STATION

(75) Inventors: Gerald Francis McBrearty, Austin, TX (US); Johnny Meng-Han Shieh, Austin, TX (US)

(73) Assignee: International Business Machine Corporation, Armonk, NY (US)

( * ) Notice: Subject to any disclaimer, the term of this patent is extended or adjusted under 35 U.S.C. 154(b) by 1386 days.

(21) Appl. No.: 12/035,563

(22) Filed: Feb. 22, 2008

(65) Prior Publication Data

US 2008/0195927 A1 Aug. 14, 2008

Related U.S. Application Data

(63) Continuation of application No. 09/714,725, filed on Nov. 16, 2000, now Pat. No. 7,349,988.

(51) Int. Cl.
*G06F 15/16* (2006.01)
*G06F 17/24* (2006.01)

(52) U.S. Cl.
USPC ........... 709/246; 709/245; 715/205; 715/207; 715/208; 715/246

(58) Field of Classification Search
USPC .. 709/245, 246, 203, 219, 226, 224; 715/205, 715/208, 207, 246
See application file for complete search history.

(56) References Cited

U.S. PATENT DOCUMENTS

| | | | | |
|---|---|---|---|---|
| 6,021,435 A * | 2/2000 | Nielsen | ......................... | 709/224 |
| 6,195,679 B1 * | 2/2001 | Bauersfeld et al. | ........... | 709/203 |
| 6,466,970 B1 * | 10/2002 | Lee et al. | ...................... | 709/217 |
| 6,615,238 B1 * | 9/2003 | Melet et al. | .................... | 709/203 |
| 7,191,400 B1 * | 3/2007 | Buvac et al. | ................... | 715/205 |
| 7,263,526 B1 * | 8/2007 | Busey et al. | .......................... | 1/1 |
| 2004/0024848 A1 * | 2/2004 | Smith et al. | .................... | 709/219 |
| 2007/0073845 A1 * | 3/2007 | Reisman | ........................ | 709/219 |
| 2007/0118803 A1 * | 5/2007 | Walker et al. | ................. | 715/744 |
| 2008/0155625 A1 * | 6/2008 | Liwerant et al. | ............... | 725/109 |

\* cited by examiner

*Primary Examiner* — Frantz Jean
(74) *Attorney, Agent, or Firm* — J. B. Kraft; David A. Mims

(57) ABSTRACT

Enabling the user to link a selected sequence of hypertext World Wide Web (Web) documents into a string and to store the string at his receiving Web display station so that these documents will be available for his use. An implementation at a receiving display station is provided for designating a received Web document as a starter document and for selecting a subsequently received Web document as a first next document. An implementation is provided for creating a hyperlink in the starter document to the first next document, together with means for storing said starter and next documents at said receiving display station.

14 Claims, 8 Drawing Sheets

LINKING A USER SELECTED SEQUENCE OF RECEIVED WORLD WIDE WEB DOCUMENTS INTO A STORED DOCUMENT STRING AVAILABLE TO THE USER AT A RECEIVING WEB STATION

This is a Continuation of application Ser. No. 09/714,725 filed on Nov. 16, 2000.

TECHNICAL FIELD

The present invention relates to computer managed communication networks such as the World Wide Web (Web) and, particularly, to systems, processes and programs for reducing users' time spent in accessing and browsing through numerous Web documents which may be of possible interest to the user.

BACKGROUND OF RELATED ART

The past decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct hyperlinks between Web pages embedded in such Web pages. This even further exploded the use of the Internet or Web. It was now possible for the Web browser or wanderer to spend literally hours going through document after document in often less than productive excursions through the Web. These excursions often strained the users' time and resources. A significant source of this drain is in the Web page itself (the basic document page of the Web).

Web documents or pages have hyperlinks setting forth terms and topics which the user may interactively click on or select to access other Web documents which, in turn, respectively have their own hyperlinks selectable by the user to access the next Web documents. Thus, browsing through Web documents often involves the time consuming process of following a thread of hyperlinked Web documents through several levels of hyperlinks, then backing up to a Web document at an earlier level, selecting another hyperlink in that document and then following another thread of hyperlinked documents through several levels.

Web developers and users are continually seeking implementations to make this Web document browsing process less cumbersome and more user friendly. At present, there are many effective browsing routines by which the user may backtrack through where he has been and passed through in his navigation in the Web in a particular session. While these approaches certainly do help the user in relocating Web pages and documents of interest and particular hyperlinks on these pages of interest, they still require that the user spend considerable time going through documents in the backtracked sequence which are of little no interest. It should also be considered that the organization of Web pages and their hyperlinks are based upon what is of universal or global user interest. On the other hand, the particular user's interests may be quite specific and not follow any universal logic.

SUMMARY OF THE PRESENT INVENTION

The present invention addresses the browsing user's particular needs in browsing through the Web by enabling the user to link a selected sequence of hypertext Web documents into a string and to store the string at his receiving Web display station so that these documents will be available for his use.

In its broadest aspects, the invention involves the combination of means at a receiving display station for designating a received Web document as a starter document, and means for selecting a subsequently received Web document as a first next document. Means are provided for creating a hyperlink in said starter document to said first next document, together with means for storing said starter and next documents at said receiving display station.

The invention further provides for an extension of the selected documents into a string through means for selecting one or more subsequently received Web documents as a subsequent next documents and means for creating a hyperlink in said first next document to the subsequent next document. The subsequent next documents are also stored at the receiving display station to thereby store a selected string of linked Web documents. Preferably, each hyperlink to a next document is visually distinct from other hyperlinks in its document, e.g. the hyperlink may be highlighted.

The invention also provides means for changing the order of the sequence of next documents in said string.

The present invention may be conveniently implemented in the browser serving the receiving display station which includes the above-mentioned means for designating a received Web document as a starter document; the means for selecting a subsequently received Web document as a first next document; the means for creating a hyperlink in said starter document to said first next document; the means for selecting at least one subsequently received Web document as a subsequent next document; and the means for creating a hyperlink in said first next document to said subsequent next document.

The starter and next documents, and said subsequent next documents, are most conveniently stored in permanent storage rather than a temporary cache associated with the Web browser at said receiving display station.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
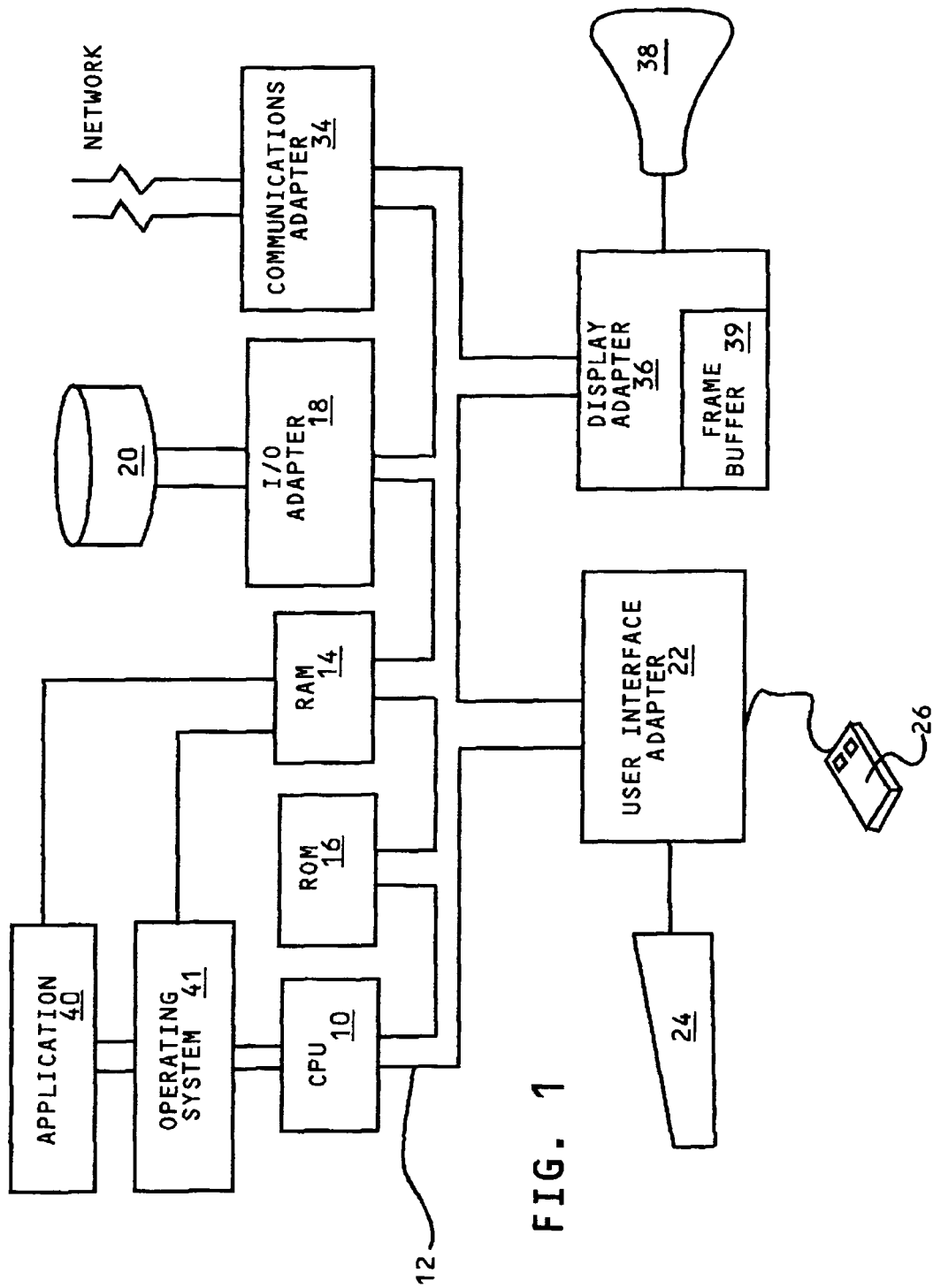
FIG. 1 is a block diagram of a data processing system including a central processing unit and network connections via a communications adapter which is capable of implementing the receiving display station on which the Web documents are selectively strung together through created additional hyperlinks in accordance with the present invention.

Referring to FIG. 1, a typical data processing terminal is shown which may function as the Web display stations used for receiving Web pages, for Web browsing and for creating a string of selected received Web documents.

A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows98™ or WindowsNT™, as well as UNIX and AIX operating systems. Application programs 40, controlled by the system, are moved into and out of the main memory Random Access Memory (RAM) 14. These programs include the programs of the present invention for creating a string of selected received Web documents to be subsequently described in combination with any conventional Web browser, such as the Netscape Navigator 3.0™ or Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or a Wide Area Network (WAN), which includes, of course, the Web or Internet. Web and Internet are meant to be generally interchangeable terms and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components; such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since the major aspect of the present invention is directed to Web pages transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999. Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers.

Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly pp. 637-642, on HTML in the formation of Web pages.

In addition, aspects of this invention will involve Web browsers. A general and comprehensive description of browsers may be found in the above mentioned *Mastering the Internet* text at pp. 291-313. More detailed browser descriptions may be found in the above-mentioned *Internet: The Complete Reference, Millennium Edition* text at Chapter 19, pp. 419-454, on the Netscape Navigator; Chapter 20, pp. 455-494, on the Microsoft Internet Explorer; and Chapter 21, pp. 495-512, covering Lynx, Opera and other browsers.

Figure 2:
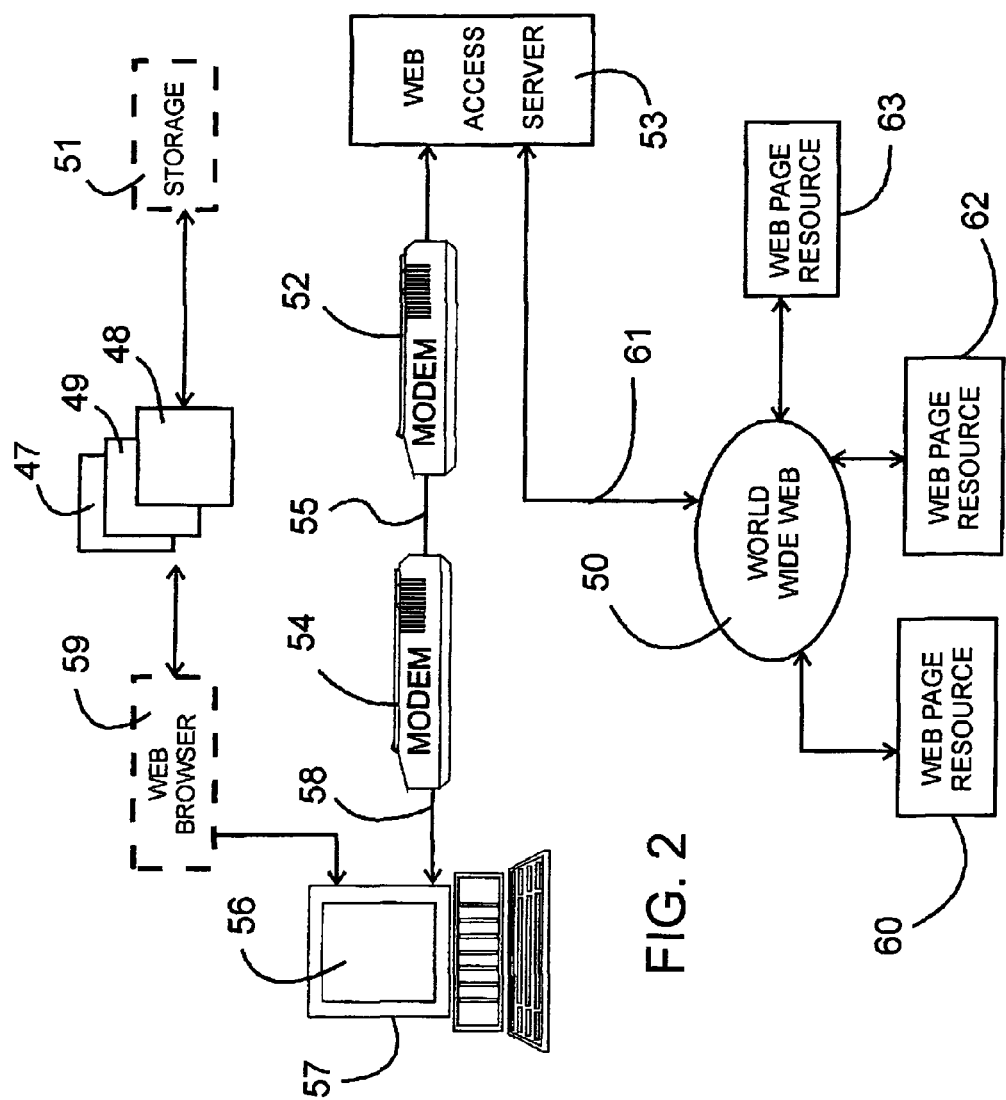
FIG. 2 is a generalized diagrammatic view of a Web portion upon which the present invention may be implemented.

A generalized diagram of a portion of the Web, to which the computer controlled display terminal 57 used for Web page receiving during searching or browsing, is connected as shown in FIG. 2. Computer display terminal 57 may be implemented by the computer system set up in FIG. 1 and connection 58 (FIG. 2) is the network connection shown in FIG. 1. For purposes of the present embodiment, computer 57 serves as a Web display station and has received displayed Web page 56, which is one of a sequence of Web pages containing an embedded hyperlink to other Web pages.

Reference may be made to the above-mentioned *Mastering the Internet*, pp. 136-147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53, which may have accessed them from the Internet 50 via linkage 61. The Web browser program 59 operates within the display terminals 57 to control the communication with the Web access server 53 to thereby download and display the accessed Web pages 56 on terminal 57. The Web access server 53 uses any search engines to access via the Web 50 and obtain Web documents from appropriate Web resources such as databases 60, 62 and 63.

With this setup, the present invention, which will be subsequently described in greater detail with respect to FIGS. 3 through 6, may be carried out using Web browser 59 and associated permanent storage facility 51 (FIG. 2) to form and store a string of user selected Web documents including starter document 47, first next document 49 and next subsequent document 48.

It should be stressed that the string should be stored in a permanent storage facility such as the disk drive storage of the receiving display station rather than the browser cache which is temporary storage. The storage of the selected string of Web documents in permanent storage provides the user with a set of Web documents in their original form. This is in contrast to other forms of Web document saving, such as bookmarking, which may provide the Web documents in changed or upgraded form when needed or the whole Web document may become no longer available. With current Web technology, documents are frequently changed on an hourly basis or even minute to minute. An advantage of the present invention is that the received and stored documents in the string are preserved in their original form.

Figure 3:
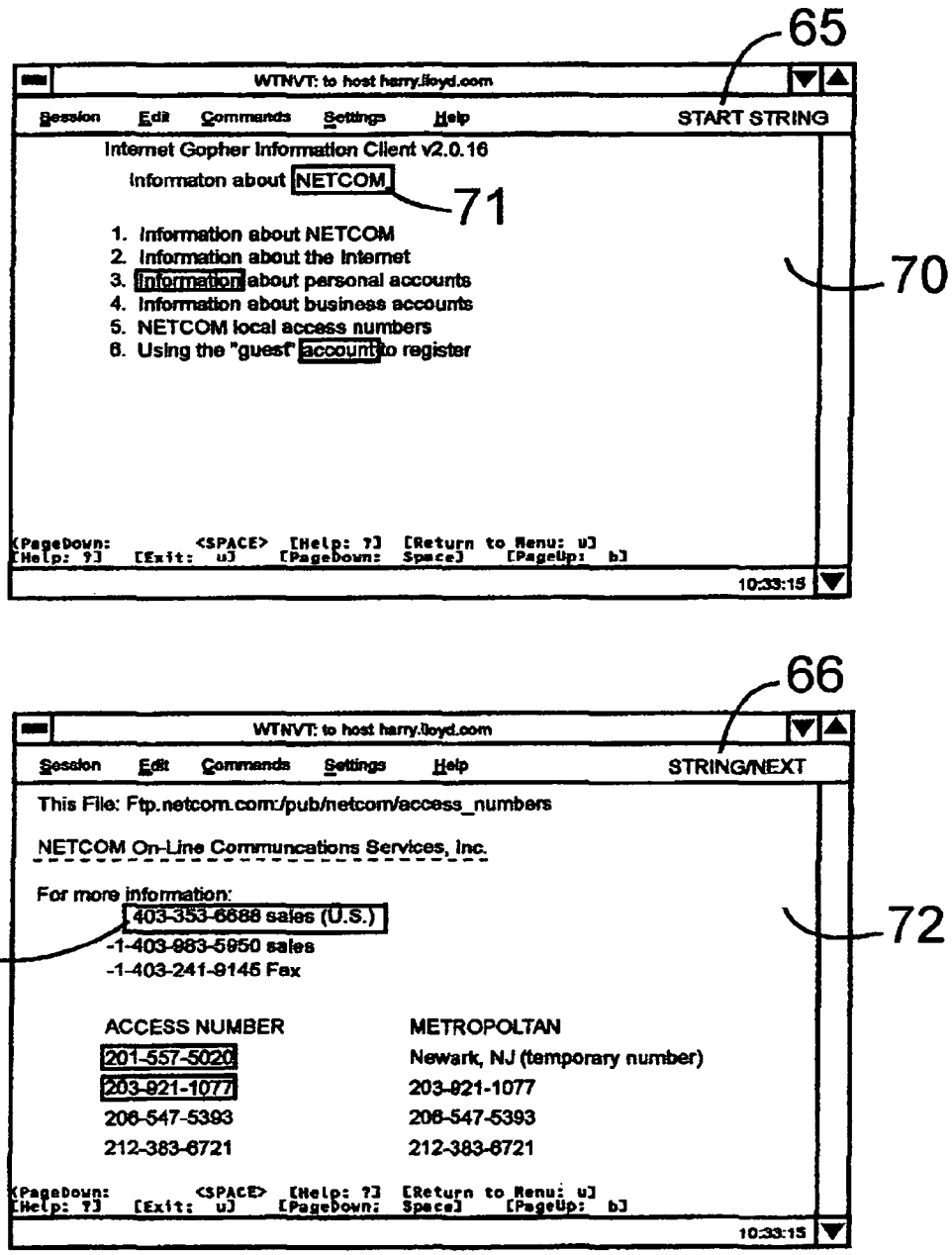
FIG. 3 is a diagrammatic view of a Web page and a selected subsequent page displayed at a receiving display station showing the original hyperlinks in each page.

FIG. 3 is an illustration of two displayed Web documents which the user decides to selectively put into the document string. Standard Web document 70, which the user has received over the Web at a receiving display station, contains text as well as standard hyperlinks 71 to other Web documents. When the user selects one of the hyperlinks by clicking on it, the browser program accesses the linked document from the Web through the document's URL and displays the accessed Web document. Thus, the user, with the aid of his browser, navigates through the Internet through the standard hyperlinks in received Web documents.

Now, in accordance with the present invention, when the user obtains a Web document in which he has a particular interest, he may wish to start a string of Web documents of his particular interests. The browser menu bar is modified to include the selectable item 65 [START STRING]. The selected document will be downloaded and stored in cache 51, FIG. 2. As the user continues to browse, the menu bar in subsequently received Web documents will now include item 66 [STRING/NEXT], as in document 72, which has standard hyperlinks 73. There can only be one starter document in a string. Thus, once a starter document is selected, all subsequently selected documents are next documents in the string.

Figure 4:
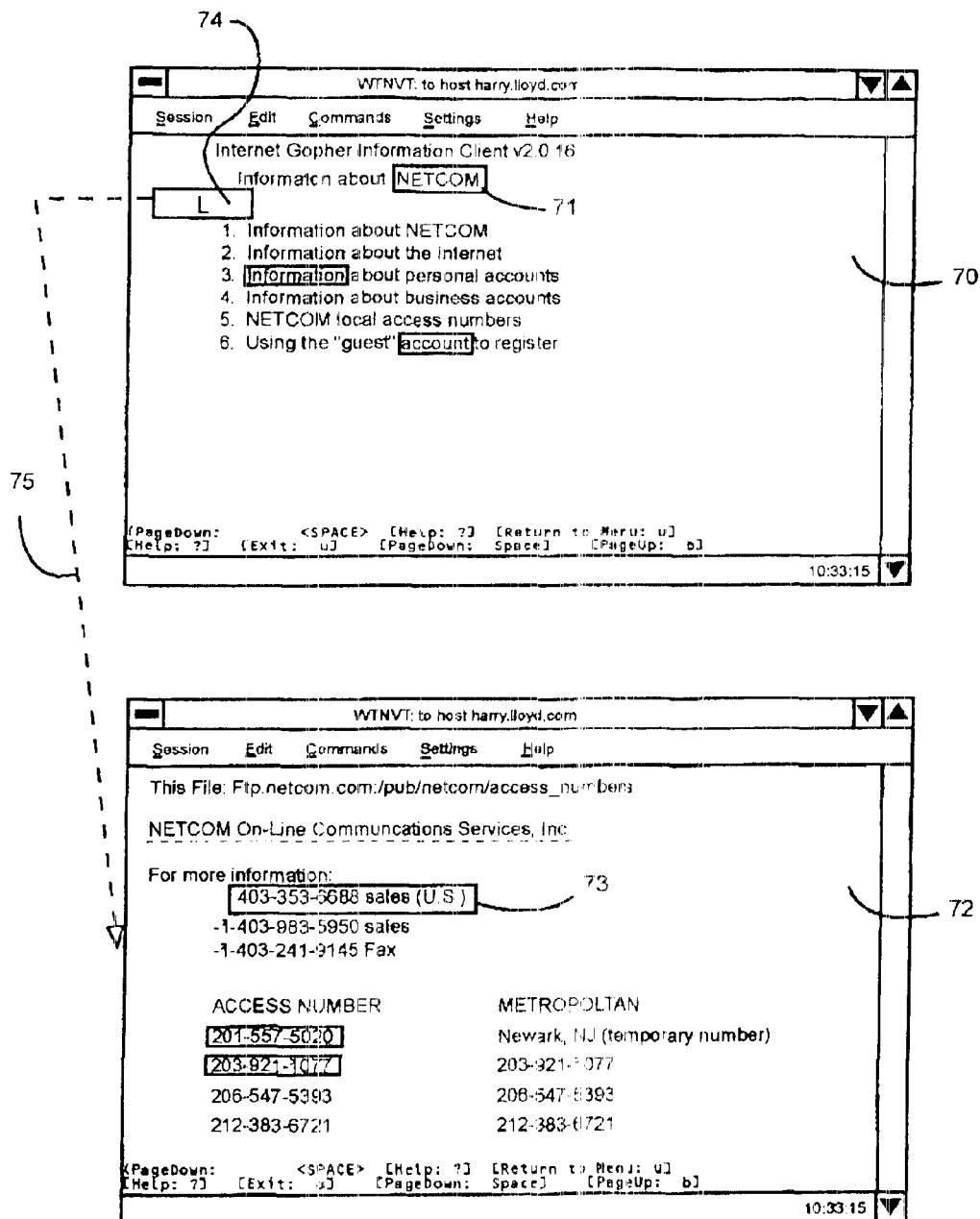
FIG. 4 is the diagrammatic view of FIG. 3 illustrating how the two pages of FIG. 3 may be selectively strung together into respective starter and first next Web documents.

Now assuming that document 72 is selected as the first next document in the string as shown in FIG. 4, then a special string hyperlink 74 will appear in starter document 70 to indicate a hyperlink to the first next document; in the present example, Web document 72. The string hyperlink 74 should be visually distinct from the other standard hyperlinks 71 so that it will stand out. It may be highlighted. Dashed line 75 diagrammatically shows the hyperlink from link 74 in starter Web document 70 to first next document 72 in the string. Document 72 is also stored in storage 51.

Figure 5:
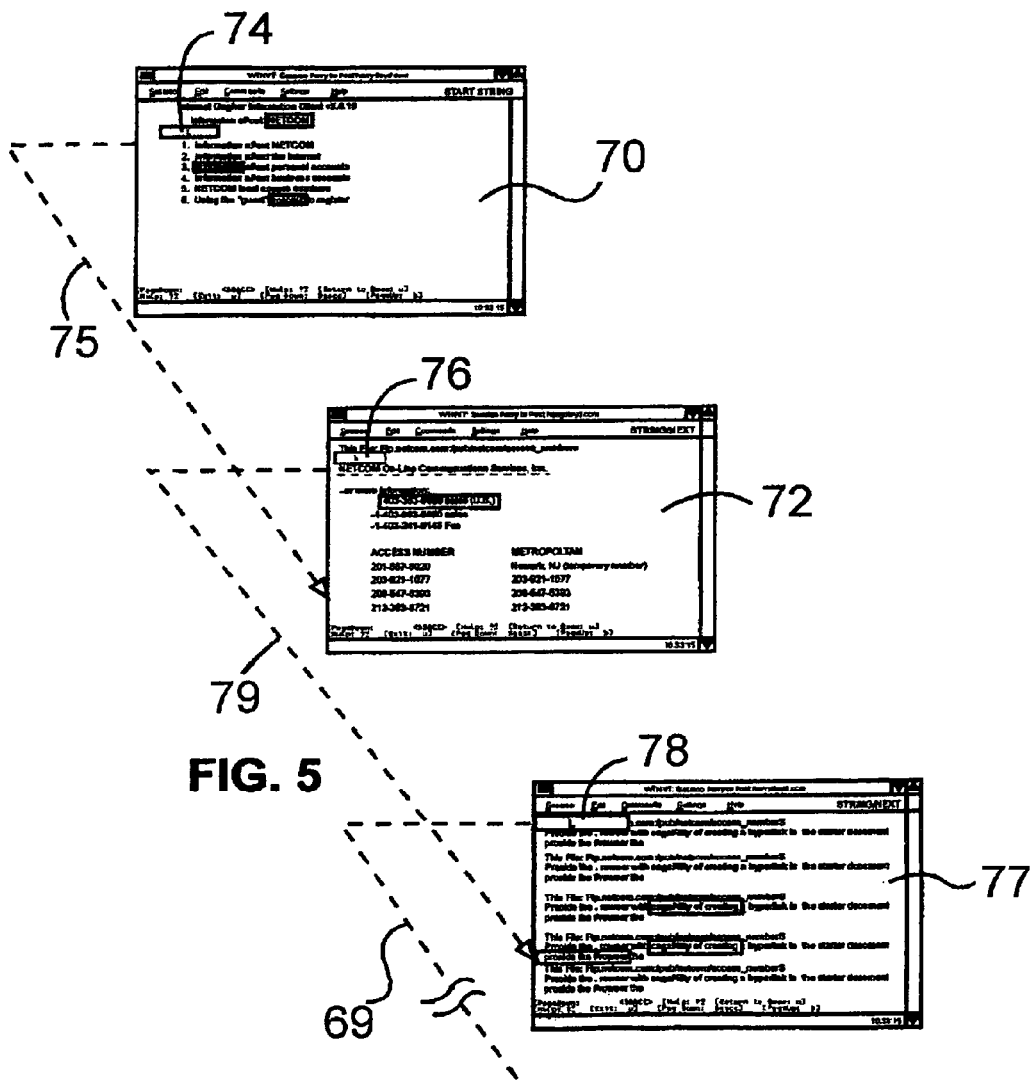
FIG. 5 is a diagrammatic view illustrative of a selected string of three Web documents.
Figure 6:
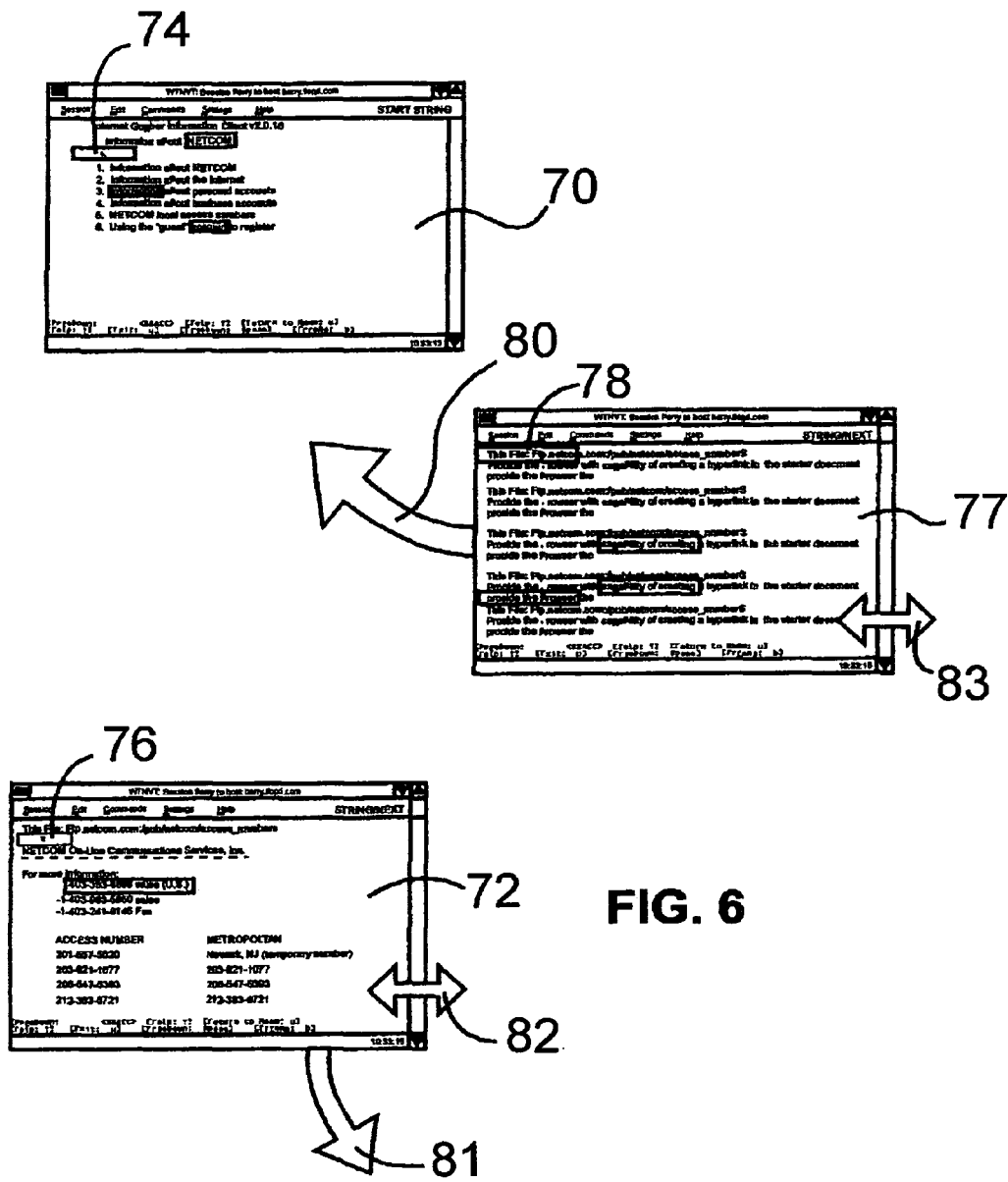
FIG. 6 is a diagrammatic view showing how the order of the three documents in the string of FIG. 5 may be changed.

FIG. 5 illustrates a string of selected Web documents formed as described above. In addition to Web documents 70 and 72, the string includes subsequent next document 77 which is strung through hyperlink 76 in first next document 72 via diagrammatic string 79. Document 77 includes a string hyperlink 78 which is shown connected via string hyperlink 78 via path 69 to the next subsequent documents in the string. Path 69 is shown as broken to indicate and include any reasonable number of selected Web documents linked as described above.

The invention includes the capability of changing the order of the Web documents in the string. In doing so, for example, the string of documents shown in FIG. 5 may be displayed as shown in FIG. 5. Then, FIG. 6, the user may interactively move the documents to change the order through mouse controlled cursors 82 and 83 which respectively move documents 72 and 77 through the paths 81 and 80 to change the order. Once the user interactive move is completed, the system will note the change in string Web documents' order and reorder the hyperlinks from links 76 and 78 to reflect the change.

It should also be noted that once a string of Web documents has been stored at a Web receiving location, such as in storage 51 associated with receiving Web station 57, that station may be provided as a Web page source or resource for distributing the created string to other stations on the Web.

Figure 7:
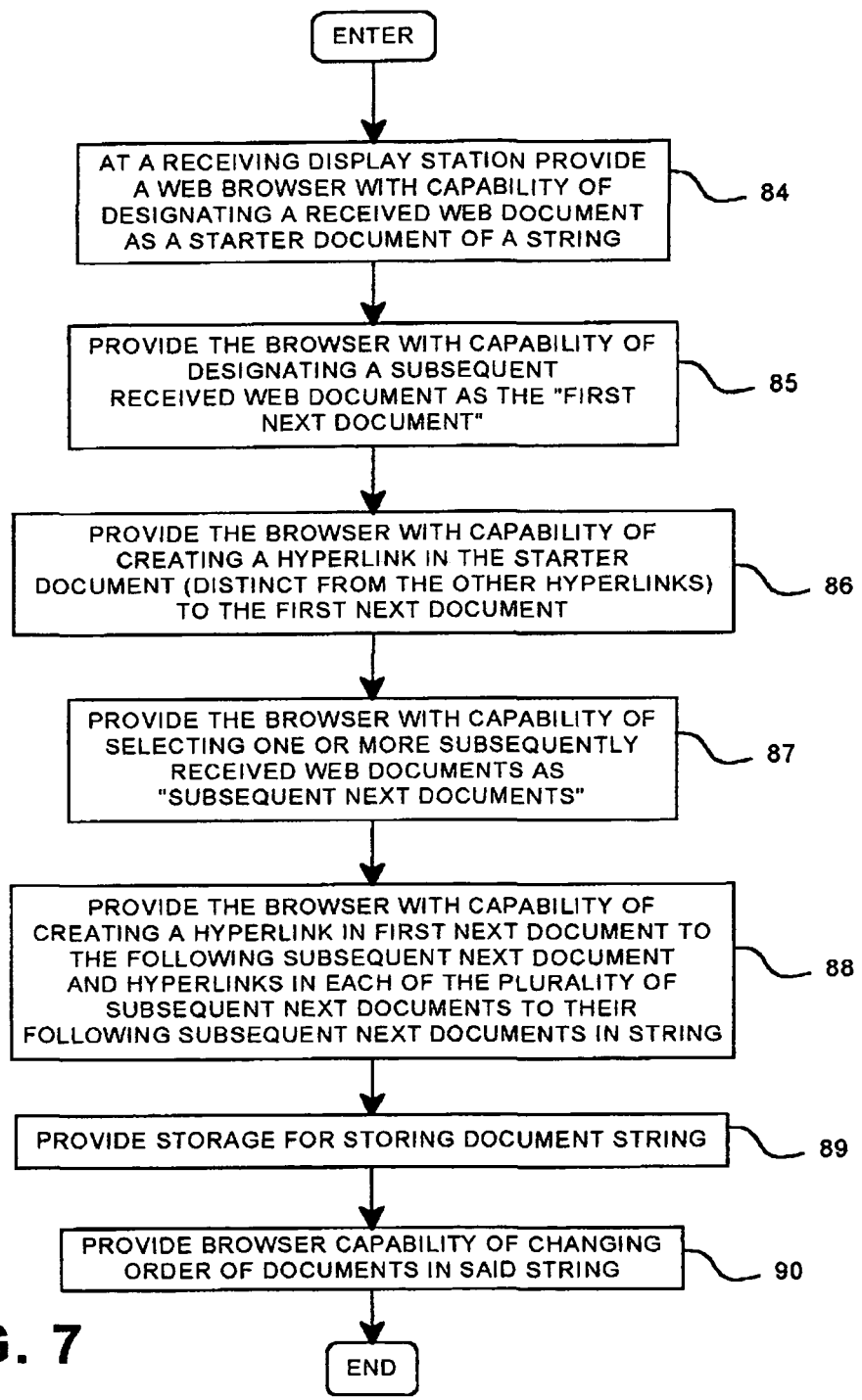
FIG. 7 is an illustrative flowchart describing the setting up of the process of the present invention for dynamically creating a selected string of hyperlinked received Web documents.

FIG. 7 is a flowchart showing the development of a process according to the present invention for selectively linking and storing a string of received Web documents. Most of the programming functions in the process of FIG. 7 have already been described in general with respect to FIGS. 3 through 6. A Web browser is provided at a receiving display station on the Web for accessing Web pages in the conventional manner and loading them at the display station, step 84. The browser has the capability of designating a received Web document as a starter document in a string. The browser also has the capability of designating a subsequently received Web document as the first next document, step 85. The browser is provided with the capability of creating a hyperlink in the starter document to the first next document, which link is visually distinct from the standard hyperlinks in the starter, step 86. The browser is provided with the further capability of selecting one or more subsequently received Web documents as subsequent next documents, step 87. The browser is also provided with the capability of creating a hyperlink in the first next document to the following subsequent next document and hyperlinks in each of the plurality of subsequent next documents to their following subsequent next documents in the string, step 88. Storage is provided for storing the document string, step 89. Also, the browser is provided with the capability of changing the order of the documents in the string, step 90.

Figure 8:
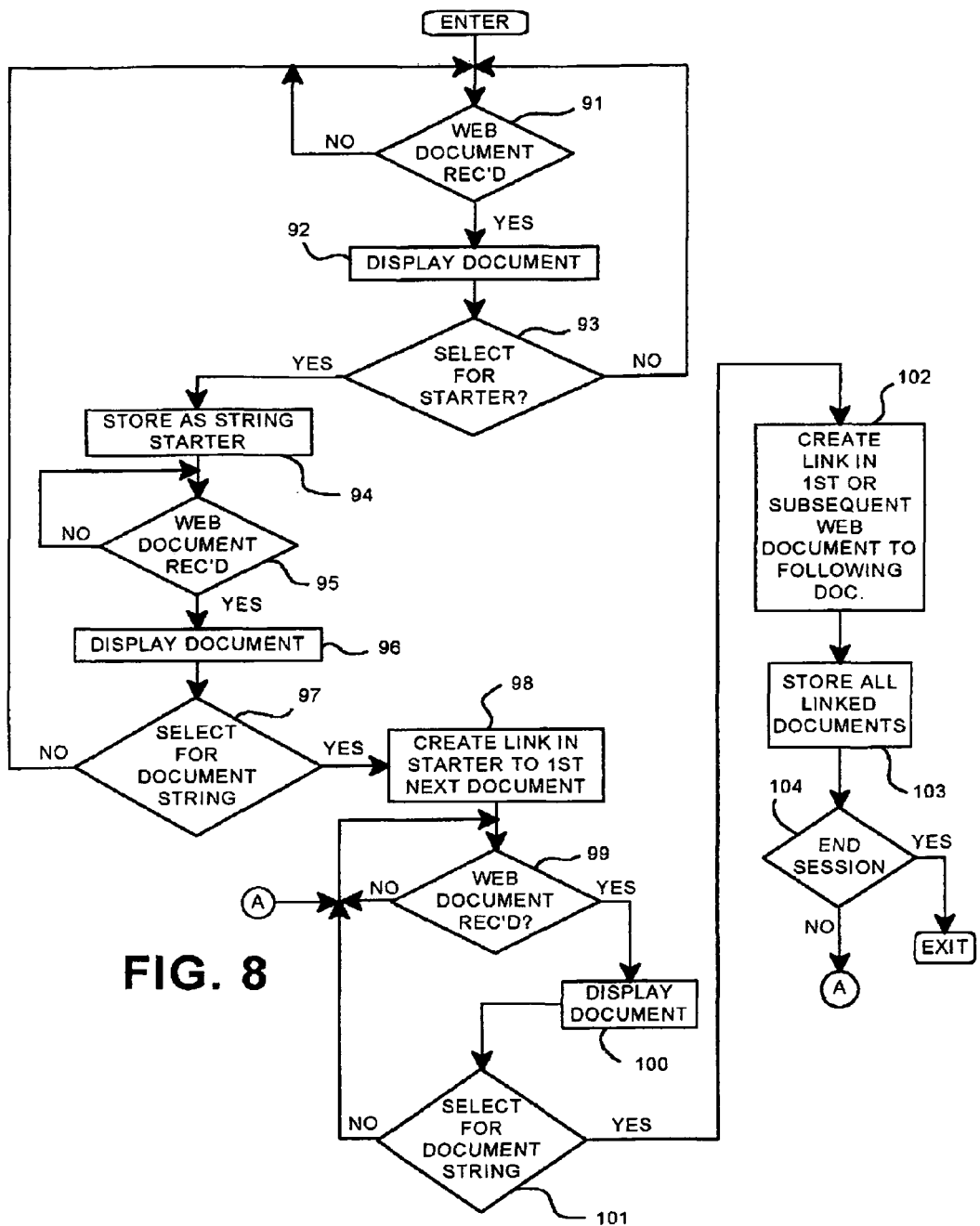
FIG. 8 is a flowchart of an illustrative run of the process set up in FIG. 7.

The running of the process setup in FIG. 7 and described in connection with FIGS. 3 through 6 will now be described with respect to the flowchart of FIG. 8. Let us assume that we are in a Web browsing session through the browser. The flowchart represents some steps in a routine which will illustrate the operation of the invention. The browser accesses the Web documents. First, a determination is made as to whether a Web document is received, step 91. If No, the process is returned to step 91 and a Web document is awaited. If Yes, a Web document is received, the document is displayed, step 92. Then, a determination is made as to whether the document has been selected as a starter document for a string, step 93. If No, then the process is returned to step 91 and the next Web document is awaited. If the decision from step 93 is Yes, then the document is stored as a string starter document, step 94. Then, a determination is made, step 95, as to whether a Web document is received. It No, then the process is returned to step 95 and the next Web document is awaited. If Yes, a Web document is received, the document is displayed, step 96. Then a determination is made as to whether the document has been selected as a next document for the string, step 97. If No, then the process is returned to step 91 and the next Web document is awaited. If the decision from step 97 is Yes, then the document is stored as the first next document and a hyperlink to it is created in the starter document, step 98.

Then, a determination is made, step 99, as to whether a Web document is received. If No, then the process is returned to step 99 and the next Web document is awaited. If Yes, a Web document is received, the document is displayed, step 100. Then a determination is made as to whether the document has been selected as a next document for the string, step 101. If No, then the process is returned to step 99 and the next Web document is awaited. If the decision from step 101 is Yes, then the document is stored as a next document and a hyperlink to it is created in the previous document, step 102. Then, step 103, all of the linked documents in the string are stored in the receiving station storage. At this time, a determination may be conveniently made as to whether the session is to be ended. If Yes, the session is exited. If No, then after each next received document the process is returned via branch "A" to step 99 where the next received Web document is awaited.

One of the preferred implementations of the present invention is in application program 40, i.e. a browser program made up of programming steps or instructions resident in RAM 14, FIG. 1, of a Web receiving station during various Web operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a Web communication network with user access via a plurality of data processor controlled interactive receiving display stations for displaying received hypertext documents of at least one display page containing embedded hyperlinks to other hypertext documents accessible from sources on the Web, a system for enabling a user to link and store a sequence of selected hypertext documents, said system comprising:
    a processor;
    a computer memory holding computer program instructions which when executed by the processor perform the method comprising:
    designating a received Web document at a receiving display station as a starter document;
    selecting a subsequently received Web document as a first next document;
    creating a hyperlink in said starter document to said first next document; and
    storing said starter and next documents at said receiving display station.

2. The system of claim 1, wherein the performed method further includes:
    selecting at least one subsequently received Web document as a subsequent next document;
    creating a hyperlink in said first next document to said subsequent next document; and
    also storing said subsequent next document at said receiving display station, wherein a selected string of linked Web documents is stored.

3. The system of claim 2, wherein:
    a plurality of subsequent next documents are selected; and
    said performed method further includes creating in each subsequent next document a hyperlink to the following subsequent next document in said string.

4. The system of claim 3, wherein said performed method further includes changing the order of the sequence of next documents in said string.

5. The system of claim 2, wherein said hyperlink to a next document is visually distinct from other hyperlinks in each document.

6. The system of claim 5, wherein said hyperlink to a next document is highlighted.

7. The system of claim 2, wherein the perform method further includes a Web browser method operatively associated with said receiving display station, said Web browser includes:
    designating a received Web document at a receiving display station as a starter document;
    selecting a subsequently received Web document as a first next document;
    creating a hyperlink in said starter document to said first next document;
    selecting at least one subsequently received Web document as a subsequent next document; and
    creating a hyperlink in said first next document to said subsequent next document.

8. A computer usable non-transitory storage medium having stored thereon a computer readable program for enabling a user to link and store a sequence of selected hypertext documents in
    a Web communication network with user access via a plurality of data processor controlled interactive receiving display stations for displaying received hypertext documents of at least one display page containing embedded hyperlinks to other hypertext documents accessible from sources on the Web, wherein the computer readable program when executed on a computer causes the computer to:
    designate a received Web document at a receiving display station as a starter document;
    select a subsequently received Web document as a first next document;
    create a hyperlink in said starter document to said first next document; and
    store said starter and next documents at said receiving display station.

9. The computer usable non-transitory storage medium of claim 8, wherein said computer readable program when executed on a computer further causes the computer to:
    select at least one subsequently received Web document as a subsequent next document;
    create a hyperlink in said first next document to said subsequent next document; and
    also store said subsequent next document at said receiving display station, wherein a selected string of linked Web documents is stored.

10. The computer usable non-transitory storage medium of claim 9, wherein:
    a plurality of subsequent next documents are selected; and
    the computer readable program when executed on a computer further causes the computer to create in each subsequent next document a hyperlink to the following subsequent next document in said string.

11. The computer usable non-transitory storage medium of claim 10, wherein said computer readable program when executed on a computer further causes the computer to change the order of the sequence of next documents in said string.

12. The computer usable non-transitory storage medium of claim 9, wherein said hyperlink to a next document is visually distinct from other hyperlinks in each document.

13. The computer usable non-transitory storage medium of claim 12, wherein said hyperlink to a next document is highlighted.

14. The computer usable non-transitory storage medium of claim 9, wherein said computer readable program further includes a Web browser program, said Web browser program when executed on a computer causes the computer to:
- designate a received Web document at a receiving display station as a starter document;
- select a subsequently received Web document as a first next document;
- create a hyperlink in said starter document to said first next document;
- select at least one subsequently received Web document as a subsequent next document; and
- create a hyperlink in said first next document to said subsequent next document.

* * * * *